Nov. 10, 1925.                                                        1,561,007
                         W. F. MacGREGOR
                          SNOW REMOVER
                      Filed April 20, 1925           2 Sheets-Sheet 1

INVENTOR.
WALLACE F. MacGREGOR
BY James A. Walsh
               ATTORNEY.

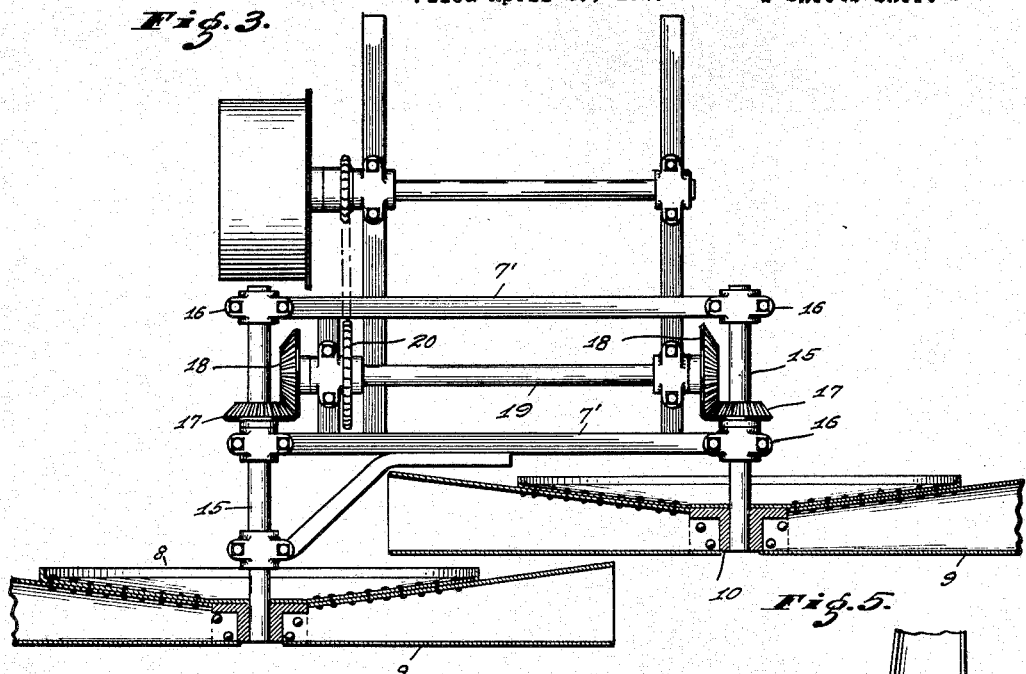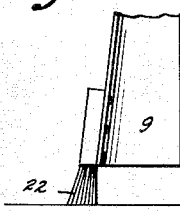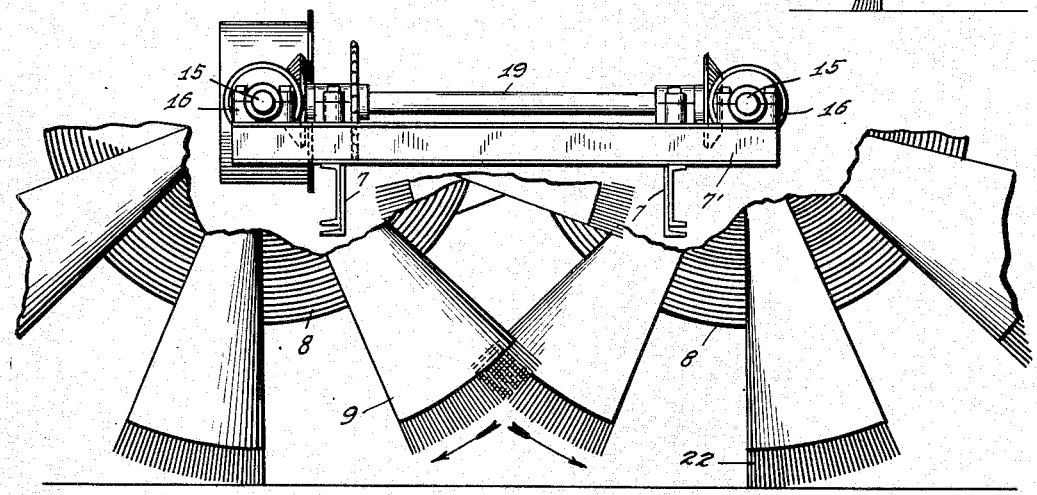

Patented Nov. 10, 1925.

1,561,007

UNITED STATES PATENT OFFICE.

WALLACE F. MacGREGOR, OF RACINE, WISCONSIN, ASSIGNOR TO J. I. CASE THRESHING MACHINE COMPANY, OF RACINE, WISCONSIN, A CORPORATION.

SNOW REMOVER.

Application filed April 20, 1925. Serial No. 24,315.

*To all whom it may concern:*

Be it known that I, WALLACE F. MACGREGOR, a citizen of the United States, residing at Racine, in the county of Racine and State of Wisconsin, have invented certain new and useful Improvements in Snow Removers, of which the following is a specification.

The object of my invention is to provide a snow remover especially adapted for use in connection with self-propelled vehicles and designed for clearing highways and streets, which I am enabled to accomplish rapidly and efficiently in a comparatively simple manner, as will be hereinafter more particularly pointed out and claimed.

Figure 1:
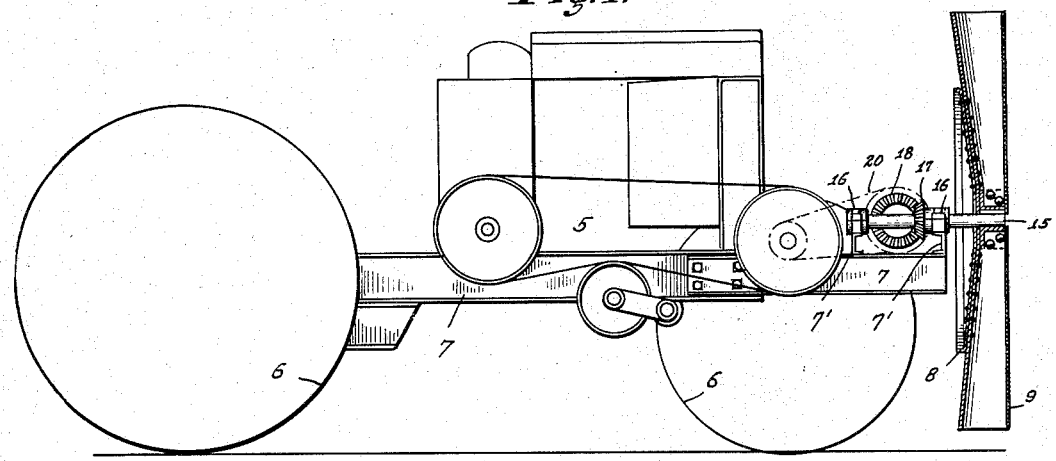
Figure 2:
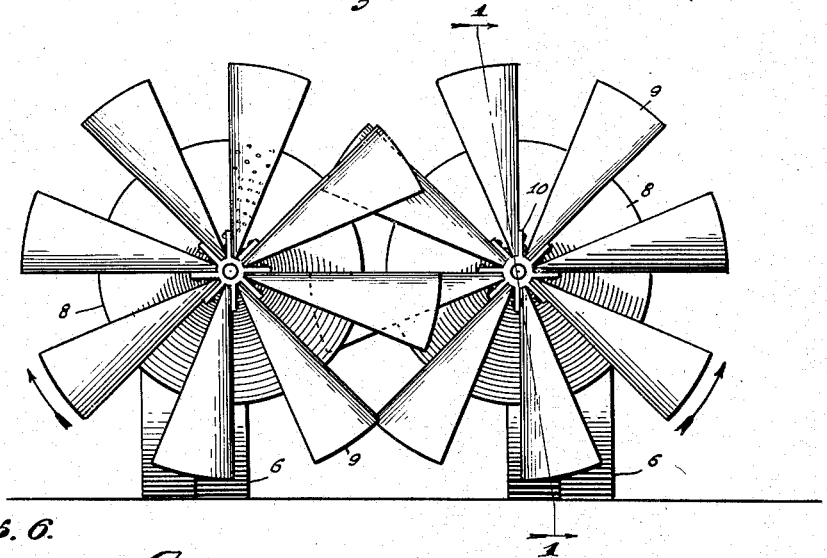
Figure 6:
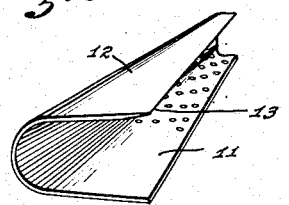

In the accompanying drawing, forming part hereof, Figure 1 is a side elevation of a tractor equipped with my improvement, the latter being shown as taken on the dotted line 1—1 in Fig. 2; Fig. 2 a front elevation; Fig. 3 a plan; Fig. 4 a fragmentary front elevation; Fig. 5 a detail, and Fig. 6 a perspective of the propeller which I employ:

In said drawings the portions marked 5, 6, indicate a tractor of any desired character, upon the frame, 7, of which I mount my improved snow removing devices in a supplemental frame 7' assembled as a unitary structure for convenient attachment to and detachment from said tractor frame. As said devices are preferably duplicates but one of the same will be described in detail, which comprises a disk, 8, to which I secure a plurality of snow cutters and propellers, 9. The inner end of snow propeller 9 may be secured to a spider, 10, and its bottom secured to disk 8, by rivets or otherwise, and projects beyond the periphery of said disk as indicated in Fig. 2. Said propeller is of tapered trough-like formation, as shown in Fig. 6, its bottom, 11, being secured to disk 8, while its upper side, 12, is provided with a cutting edge, 13, said propeller being open throughout its length and outer end. Each snow removing device is provided with a shaft, 15, mounted in bearings, 16, on the frame 7', and carries a bevel gear, 17, meshing with a driving gear, 18, mounted upon a shaft, 19, the latter being driven by a sprocket-and-chain system, 20, receiving power from the tractor mechanism. Said snow removing devices are arranged in staggered relation, one slightly in advance of the other, and the gearing 17, 18, for each device is so arranged that they will be rotated in opposite directions, as indicated by the arrows in Fig. 2. Figs. 4 and 5 show a slight modification from Fig. 2, in that under certain conditions I may also employ a brush, 22, of any suitable character connected to the propellers or otherwise associated with the snow removing device.

In the operation of my improved snow remover it will be understood that the self-propelled tractor moves along the road with the snow removing devices rapidly rotating in opposite directions with the result that the sharp-edged propellers 9 cut through the fallen snow and scoop the same, discharging it by centrifugal force through the open end of the propellers, and as each device is discharging at its outer side it will be readily understood that an effective removal of the snow is efficiently accomplished. While a slight ridge may be left between the overlapping propellers such may be removed for practical purposes by employing the brushes 22 as indicated in Fig. 4, but ordinarily this is unnecessary as the action and range of travel of the rotating propellers is sufficiently effective. However, in localities where the snow fall continues heavily a complement of tractors equipped with my improvement will thoroughly remove small hills or ridges, and by providing the propellers with sharp cutting edges packed snow will be readily cut through and removed in the manner stated.

I claim as my invention:

1. The combination, with a vehicle, of a snow impeller comprising a detachable frame, a rotatable snow remover embodying a disk, an open-ended trough-shaped impeller thereon embodying a cutting-edge, and means connected to said frame for rotating said snow remover to impel snow laterally therefrom.

2. The combination, with a vehicle, of rotatable snow removers one positioned in advance of the other and each having open-ended trough-shaped propellers embodying a cutting edge, the propellers of the outer snow remover overlapping those of the inner snow remover in their rotary paths, and means for rotating said snow removers.

3. A snow removing device comprising a plurality of open-ended trough-shaped impellers each having a cutting-edge, a frame supporting said device, means for actuating said device to discharge snow laterally therefrom, and a brush at the end of each impeller for removing snow.

In testimony whereof I affix my signature.

WALLACE F. MacGREGOR.